United States Patent
Hu et al.

(10) Patent No.: US 6,972,390 B2
(45) Date of Patent: Dec. 6, 2005

(54) MULTI-LASER BEAM WELDING HIGH STRENGTH SUPERALLOYS

(75) Inventors: Yiping Hu, Greer, SC (US); William F. Hehmann, Greer, SC (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/794,207

(22) Filed: Mar. 4, 2004

(65) Prior Publication Data

US 2005/0194363 A1    Sep. 8, 2005

(51) Int. Cl.$^7$ .............................................. B23K 26/34
(52) U.S. Cl. ............. 219/121.64; 148/525; 219/121.63
(58) Field of Search ..................... 219/121.63, 121.64, 219/121.76, 121.77; 148/525, 565

(56) References Cited

U.S. PATENT DOCUMENTS

| | | | |
|---|---|---|---|
| 4,804,815 A * | 2/1989 | Everett ................. | 219/121.66 |
| 5,106,010 A | 4/1992 | Stueber et al. | |
| 5,308,409 A * | 5/1994 | Kamimura et al. ......... | 148/512 |
| 5,554,837 A * | 9/1996 | Goodwater et al. .... | 219/121.63 |
| 5,914,059 A * | 6/1999 | Marcin et al. ......... | 219/121.66 |
| 6,054,672 A | 4/2000 | Foster et al. | |
| 6,191,379 B1 | 2/2001 | Offer et al. | |
| 6,269,540 B1 * | 8/2001 | Islam et al. ................ | 29/889.7 |
| 6,364,971 B1 | 4/2002 | Peterson, Jr. et al. | |
| 6,596,411 B2 * | 7/2003 | Feng et al. ................. | 428/637 |
| 2005/0028897 A1 * | 2/2005 | Kurz et al. ................. | 148/525 |

FOREIGN PATENT DOCUMENTS

JP    2001-269784 A    * 10/2001

* cited by examiner

Primary Examiner—Geoffrey S. Evans
(74) Attorney, Agent, or Firm—Ingrassia Fisher & Lorenz (57) ABSTRACT

A method is provided for repairing degraded and/or eroded areas on gas turbine blades and vanes. The method is directed to turbine blades and vanes made of advanced superalloy materials with high elevated-temperature properties. The method uses multiple laser beams to perform steps of preheating the repair area, welding the repair area, and post-welding heating of the repaired area. The method uses an array of two or more lasers to perform the steps of heating, welding, and post-weld heat treatment in nearly simultaneous operation thereby dramatically reducing or eliminating the hot cracking associated with other welding methods used with superalloy materials. The method is further directed to cladding or material buildup of degraded turbine blades where the weld material is the same as the matrix or better superalloy materials.

37 Claims, 5 Drawing Sheets

FIG. 7: Nominal Compositions of Some Superalloys.

| Alloy | Ni | Co | Cr | Mo | W | Ta | Al | Ti | C | B | Nb | Zr | Other |
|---|---|---|---|---|---|---|---|---|---|---|---|---|---|
| IN738LC | Bal. | 8.5 | 16.0 | 1.75 | 2.6 | 1.75 | 3.4 | 3.4 | .11 | .01 | .9 | .05 | -- |
| C101 | Bal. | 9.0 | 12.6 | 1.9 | 4.17 | 4.17 | 3.4 | 4.0 | .13 | .015 | .10 | .03 | .9Hf |
| Mar-M247 | Bal. | 10.0 | 8.25 | .7 | 10.0 | 3.0 | 5.5 | 1.0 | .15 | .015 | -- | .05 | 1.5Hf |
| GTD111 | Bal. | 9.5 | 14.0 | 1.5 | 3.8 | 2.8 | 3.0 | 4.9 | .10 | .01 | -- | .03 | -- |
| Rene 80 | Bal. | 9.5 | 14.0 | 4.0 | 4.0 | -- | 3.0 | 5.0 | .17 | .015 | -- | .02 | -- |
| PWA 1480 | Bal. | 5.0 | 10.0 | -- | 4.0 | 12.0 | 5.0 | 1.5 | -- | -- | -- | -- | -- |
| PWA 1483 | Bal. | 9.0 | 12.8 | 1.9 | 3.8 | 4.0 | 3.6 | 4.0 | -- | -- | -- | -- | -- |
| Rene N4 | Bal. | 7.5 | 9.8 | 1.5 | 6.0 | 4.8 | 4.2 | 3.5 | .06 | .004 | 0.5 | -- | .15Hf |
| CMSX-2 | Bal. | 5.0 | 8.0 | 0.6 | 8.0 | 6.0 | 5.6 | 1.0 | -- | -- | -- | -- | -- |
| PWA 1484 | Bal. | 10.0 | 5.0 | 2.0 | 6.0 | 9.0 | 5.6 | -- | -- | -- | -- | -- | 0.1Hf/3.0Re |
| Rene N5 | Bal. | 8.0 | 7.0 | 2.0 | 5.0 | 7.0 | 6.2 | -- | .06 | .004 | 3.0 | -- | 0.2Hf/3.0Re |
| CMSX-4 | Bal. | 9.0 | 6.5 | 0.6 | 6.0 | 6.5 | 5.6 | 1.0 | -- | -- | -- | -- | 0.1Hf/3.0Re |
| SC-180 | Bal. | 10.0 | 5.0 | 2.0 | 5.0 | 8.5 | 5.2 | 1.0 | -- | -- | -- | -- | 0.1Hf/3.0Re |

MULTI-LASER BEAM WELDING HIGH STRENGTH SUPERALLOYS

FIELD OF THE INVENTION

The present invention relates to laser powder fusion welding of metallic materials. More particularly the invention relates to laser welding methods using multiple laser beams to repair gas turbine engine components such as turbine blades and vanes.

BACKGROUND OF THE INVENTION

In an attempt to increase the efficiencies and performance of contemporary gas turbine engines generally, engineers have progressively pushed the engine environment to more extreme operating conditions. The harsh operating conditions of high temperature and pressure that are now frequently specified place increased demands on engine component-manufacturing technologies and new materials. Indeed the gradual improvement in engine design has come about in part due to the increased strength and durability of new materials that can withstand the operating conditions present in the modern gas turbine engines. With these changes in engine materials, there has arisen a corresponding need to develop new repair methods appropriate for such materials.

The turbine blade is one important engine component that directly experiences severe operation conditions. Turbine blades are thus designed and manufactured to perform under repeated cycles of high stress and high temperature. An economic consequence of such a design criteria is that currently used turbine blades can be quite expensive. It is thus highly desirable to maintain turbine blades in service for as long as possible, and to return degraded turbine blades to service, if possible, through acceptable repair procedures.

Turbine blades used in modern gas turbine engines are frequently castings from a class of materials known as superalloys. The superalloys include nickel-based, cobalt-based and iron-based superalloys. In the cast form, turbine blades made from advanced superalloys include many desirable properties such as high elevated-temperature strength and good environment resistance. Advantageously, the strength displayed by this material remains present even under stressful conditions, such as high temperature and high pressure, experienced during engine operation.

The superalloys are thus a preferred material for the construction of turbine blades and vanes. The high strength superalloys are noted as precipitation hardening alloys. Nickel, alloyed with other elements such as aluminum and titanium, develops high strength characteristics that are sustainable at high temperatures. The strength arises in part through the presence of a gamma prime ($\gamma'$) phase of the material. One characteristic of the superalloys is the high degree of gamma prime in cast materials.

Disadvantageously, the superalloys generally are very difficult to weld successfully. Various methods have been developed and are described in the technical literature related to resurfacing, restoring, repairing, and reconditioning worn turbine blades and Z-notch faces.

Traditional repair methods have proven less satisfactory for superalloy materials. For example, some known welding techniques heat a turbine blade to high temperatures, ranging from 1800 to 2000 F before welding process. However, during such a high temperature welding, the turbine blade may experience severe oxidation, giving the blade undesired properties for further engine service. Hence, it is desirable to find a repair method suitable for superalloys that does not subject the workpiece matrix to heat-induced damage.

Other repair methods also include a post-welding heat treatment. This treatment may heat the welded workpiece to a given temperature level, and cause severe cracking due to residual stress relief and gamma prime precipitation. A preferred method for cladding material to a surface of a turbine blade or turbine vane would address the problems encountered in a post-welding heat treatment.

A welding operation of particular relevance for repair of gas turbine engine components is the cladding or buildup of material on a workpiece surface as opposed to the welding together of two workpieces at two matching surfaces. In cladding operations it is desired to restore a worn surface on a workpiece to dimensions consistent with the originally manufactured piece. Moreover, in gas turbine engines it is desired to match and/or use better cladding material with the underlying matrix of the workpiece.

The option of throwing out worn turbine blades and replacing them with new ones is not an attractive alternative. The blades are extremely expensive due to costly material and manufacturing process. A high pressure turbine blade made of superalloy can be quite costly to replace, and a single stage in a gas turbine engine may contain several dozen such blades. Moreover, a typical gas turbine engine can have multiple rows or stages of turbine blades. Consequently there is a strong financial need to find an acceptable repair method for superalloy turbine blades and vanes.

Hence, there is a need for a turbine blade repair method that addresses one or more of the above-noted drawbacks. Namely, a repair method is needed that can fully restore geometry, dimension and desired properties of degraded components and/or a method that does not involve a complicated process, and by virtue of the foregoing is therefore less costly as compared to the alternative of replacing worn parts with new ones. The present invention addresses one or more of these needs.

SUMMARY OF THE INVENTION

The present invention provides a method for repairing superalloy turbine blades and vanes. The method uses multiple lasers to perform a heating step and/or a cladding step and/or a post-welding heating step. This method can use multiple lasers to create a highly localized area of heating that either reduces or eliminates weld-induced damage or hot cracking formation. The method allows repaired turbine blades to return to service and therefore offers considerable cost savings over the replacement alternative.

In one embodiment, and by way of example only, there is provided a method for restoring a worn surface of a gas turbine engine component comprising: moving a first laser beam over a workpiece surface at a given speed where the first laser beam is projected onto the workpiece at a first laser beam spot; moving a second laser beam over a workpiece surface at approximately the same given speed as the first laser beam where the second laser beam is projected onto the workpiece at a second laser beam spot; setting the first laser beam spot at a set distance from the second laser beam spot; and feeding a superalloy powder to the worn surface of the component. The first laser beam may carry a power of between about 50 to about 2500 watts, and more preferably between about 50 to about 1500 watts. The superalloy powder is fed to the worn surface of the component at a powder feed rate of between about 1.5 to about 20 grams per minute, and may be done at between about 1.5 to about 10 grams per minute. The rate of speed of the first laser beam and the second laser beam relative to the work table is about 5 to about 22 inches per minute, and may be between about 5 to about 14 inches per minute. The diameter of the first laser beam spot is between approximately 0.02 to about 0.10 inches, and may be between 0.040 to about 0.060 inches. The second laser beam spot has a diameter of between approximately 0.020 and approximately 0.300 inches, and may be between about 0.040 and about 0.160 inches. The second laser beam carries a power of between approximately 50 and approximately 1,800 watts, and may be between about 50 and about 1200 watts. The distance between the first laser beam spot and the second laser beam spot is between approximately 0.060 and approximately 0.500 inch, and may be preferably between about 0.060 and about 0.280 inches.

In a further embodiment and by way of example only there is provided a method for laser cladding a worn surface of a gas turbine engine component comprising: moving a first laser beam over a workpiece surface at a given speed where the first laser beam is projected onto the workpiece at a first laser beam spot; providing a first energy through the first laser beam thereby heating the workpiece surface at the first laser beam spot; moving a second laser beam over a workpiece surface, simultaneous to the movement of the first laser beam, at approximately the same given speed as the first laser beam where the second laser beam is projected onto the workpiece surface at a second laser beam spot; providing a second energy through the second laser beam thereby heating the workpiece surface at the second laser beam spot; setting the first laser beam spot at a set distance from the second laser beam spot; feeding a superalloy powder to the worn surface of the component; and heating said superalloy powder thereby affecting a laser cladding on the workpiece surface. The method may further comprise controlling the movement of the first laser beam and the second laser beam whereby the second laser beam spot sweeps across at least a part of the area on the workpiece surface covered by the first laser beam spot, or alternatively, whereby the first laser beam spot sweeps across at least a part of the area on the workpiece surface covered by the second laser beam spot. The method may also include having the first laser beam spot be smaller in area than the second laser beam spot, or alternatively, the first laser beam spot be larger in area than the second laser beam spot. The method also includes that the first laser beam provides a preheating and the second laser beam provides laser cladding. The method further comprises moving a third laser beam over a workpiece surface at a given speed where the third laser beam is projected onto the workpiece surface at a third laser beam spot; and providing a third energy through the third laser beam thereby heating the workpiece surface at the third laser beam spot. In the case of three lasers the first laser beam provides a preheating, the second laser beam provides laser powder fusion welding, and the third laser beam affects a post-welding heat treatment, and the first power, second power, and third power are controlled so that the cladding occurs with no to minimal hot cracking in both the buildup and the workpiece.

In a further exemplary embodiment also by way of example only there is provided an apparatus for laser cladding a worn surface of a gas turbine engine blade or vane comprising: a first laser generating a first laser beam that is projected onto a surface at a first laser beam spot; a second laser generating a second laser beam that is projected onto a surface at a second laser beam spot; means for moving the first laser and second laser relative to the surface whereby the first laser beam spot and second laser beam spot move over the surface but are held at a given distance apart; and means for discharging a superalloy powder onto the surface. The first laser preheats the surface and the second laser clads the surface, or alternatively, the second laser preheats the surface and the first laser clads the surface. The primary laser is selected from the group consisting of $CO_2$, Nd:YAG, direct diode, and fiber lasers. The secondary laser is a fiber laser, direct diode laser, or Nd:YAG laser. The advanced superalloy matrix or substrate is selected from at least one of the group consisting of INCO738, C 101, MarM247, GTD111, Rene 125, Rene142, Rene N5, SC180, CMSX-2, CMSX-4, CMSX-10, and PWA 1480 and 1484. The superalloy powder is selected from at least one of the group consisting of: HS-188, Stellite 694, Hastelloy X, INCO 713, INCO 738, INCO 939, MarM247, Rene 80, C 101, and modified MCrAlY. The apparatus may further comprise means for heating the superalloy powder whereby said superalloy powder provides a laser cladding on the work surface.

In still a further embodiment, still by way of example only, there is provided an apparatus for laser cladding a worn surface of a gas turbine engine superalloy blade or vane comprising: a first laser generating a first laser beam that is projected onto a worn surface at a first laser beam spot; a second laser generating a second laser beam that is projected onto a worn surface at a second laser beam spot; a third laser generating a third laser beam that is projected onto a worn surface at a third laser beam spot; means for moving the first laser beam, the second laser beam, and the third laser beam thereby moving the first laser beam spot, second laser beam spot, and third laser beam spot on the worn surface; means for controlling the energy provided to the first laser, the second laser, and the third laser thereby controlling the amount of heating on the worn surface provided by the first laser beam spot, the second laser beam spot, and the third laser beam spot; and means for providing a filler material to the worn surface for providing a laser cladding layer to the worn surface. The means for moving may comprise a CNC controlled work table.

Other independent features and advantages of the multi-laser beam welding of high strength superalloys apparatus and method will become apparent from the following detailed description, taken in conjunction with the accompanying drawings which illustrate, by way of example, the principles of the invention.

DETAILED DESCRIPTION OF A PREFERRED EMBODIMENT

Reference will now be made in detail to exemplary embodiments of the invention, examples of which are illustrated in the accompanying drawings. Wherever possible, the same reference numbers will be used throughout the drawings to refer to the same or like parts.

Figure 1:
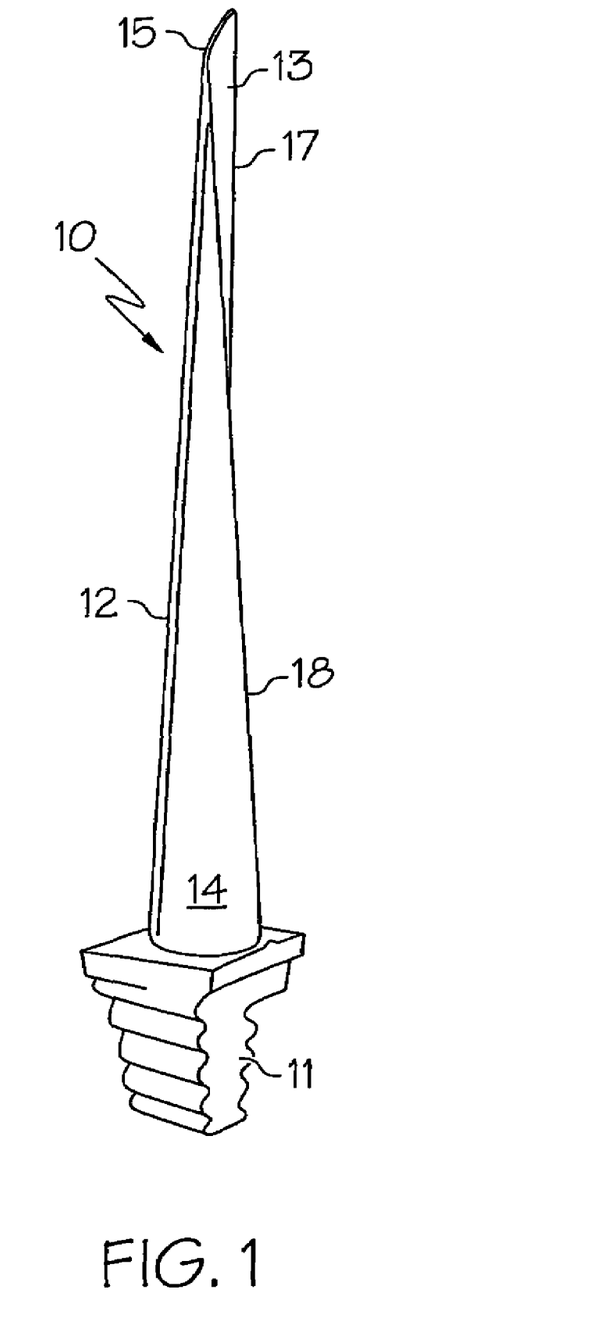
FIG. 1 is a perspective view of a turbine blade processed in accordance with an embodiment of the invention.

A typical gas turbine blade 10 is illustrated in FIG. 1. Such a blade has different geometry and dimension designs, depending on engine model and its application. For a typical aero-engine, a turbine blade is typically several inches in length. A gas turbine blade includes a serrated base assembly 11, also called a mounting dovetail, tang, or christmas tree, where the blade is affixed to a hub (not shown). In a jet engine assembly multiple such turbine blades are positioned in adjacent circumferential position along a hub or rotor disk. Airfoil 12, a cuplike structure, includes a concave face 13 and a convex face 14. In the literature of turbine technology airfoil 12 may also be referred to as a bucket. Airfoil 12 extends radially outwardly from the hub.

In operation, gases impinge on concave face 13 of airfoil 12 thereby providing the driving force for the turbine engine. Turbine blade 10 also includes leading edge 17 and trailing edge 18 which represent the edges of airfoil 12 that firstly and lastly encounter an air stream passing around airfoil 12.

Figure 2:
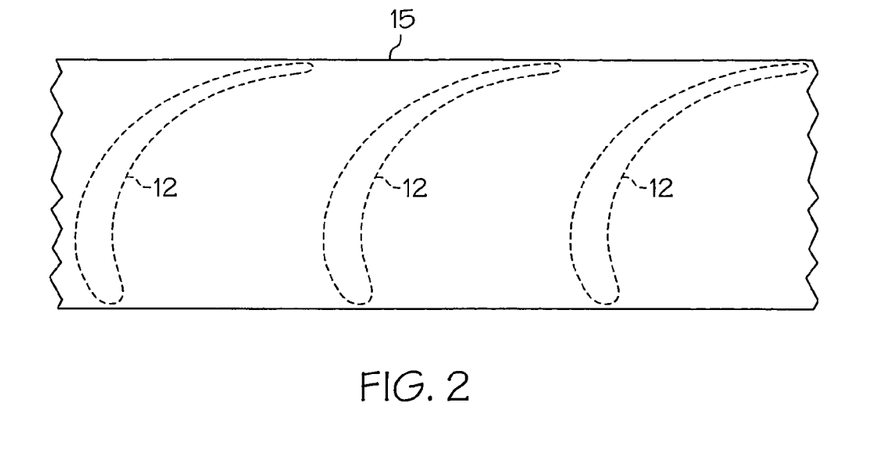
FIG. 2 is a top view showing the tip of HPT turbine blades at the shroud.

FIG. 2 shows a top view of a typical shroud structure surrounding a high pressure turbine (HPT) blade. Turbine shroud 15 is formed so as to surround turbine blades at their tips. Shown in dashed outline on FIG. 2 is airfoil 12 that underlines shroud 15. The shrouds used at high pressure stages in contemporary jet engines include a groove in which airfoil tips move. At this point the airfoil experiences particularly high pressures. Consequently the tips of HPT turbine blades often need restoration. Low pressure turbine blades may also include a shroud with a Z-notch. The Z-notch refers to a configuration of the shroud. Neighboring low pressure blades interlock at the Z-notch areas. The Z-notches are points of contact between turbine blades, and the interlocking faces of Z-notches thus experience wear and erosion. Consequently, over a period of time in operation, turbine blades need to be repaired or resurfaced. The Z-notch area of contact is a typical area that needs such reworking; and notch faces thus form a workpiece for the laser repair method of the present invention.

The gamma prime precipitation-strengthened nickel base superalloys are generally described as those which have high strength even at temperatures of 1600° F. or higher. Generally, these superalloys have an ultimate tensile strength of at least 125 Ksi at 1200° F. and at least 100 Ksi at 1600° F., a yield strength at 0.2% offset of at least 100 Ksi at 1200° F. and at least 70 Ksi at 1600° F. and a rupture strength (1000 hour) of at least 25 Ksi at 1600° F. (See, SUPERALLOYS II, edited by Sims, et al., John Wiley & Sons, 1987, pp. 581–86.)

Figure 7:
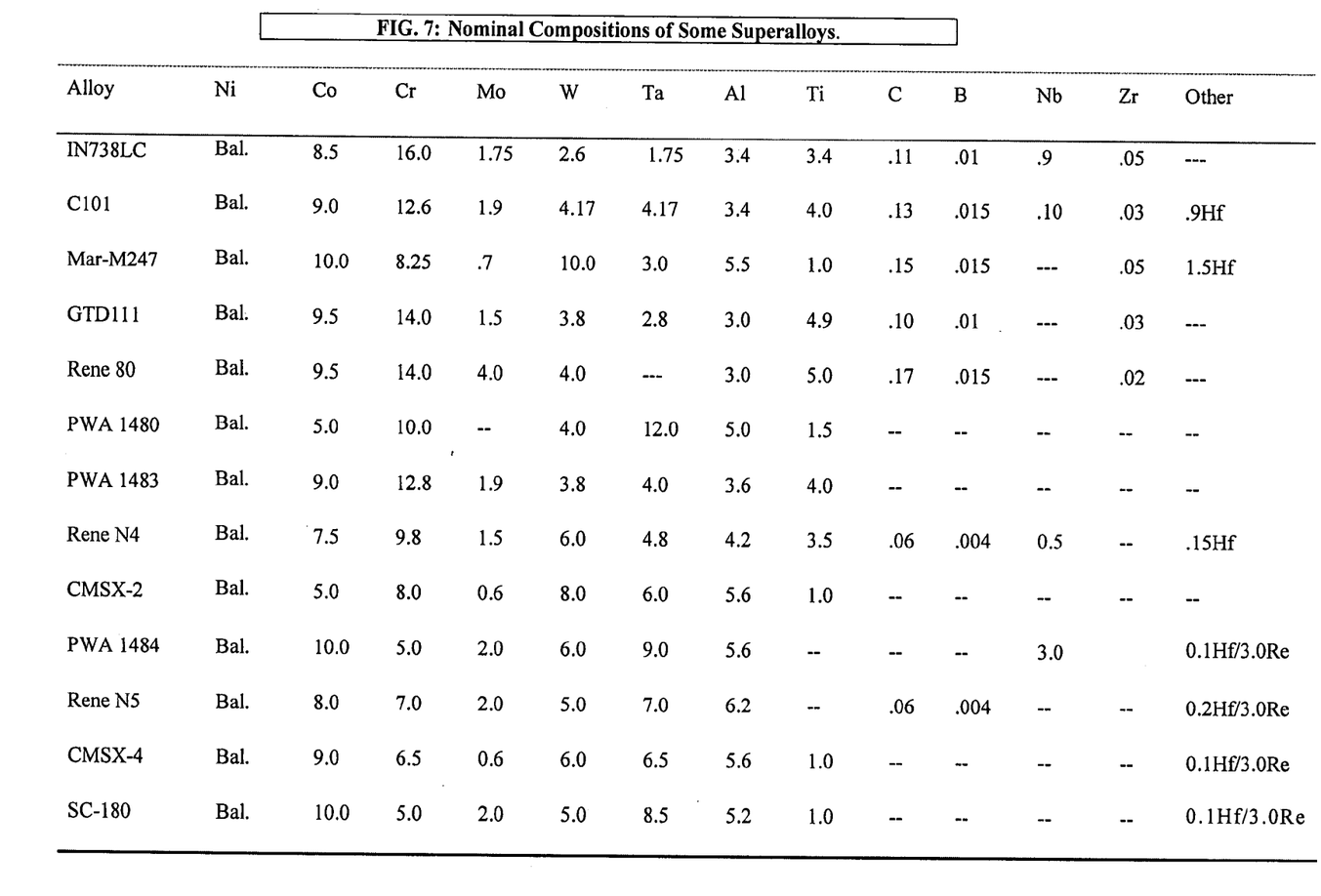
FIG. 7 is a table that shows nominal compositions by weight percent of some superalloys that may be used in this invention.

FIG. 7 is a table that shows nominal compositions by weight percent of some superalloys that may be used in this invention. In each case the balance of the composition is nickel.

Figure 3:
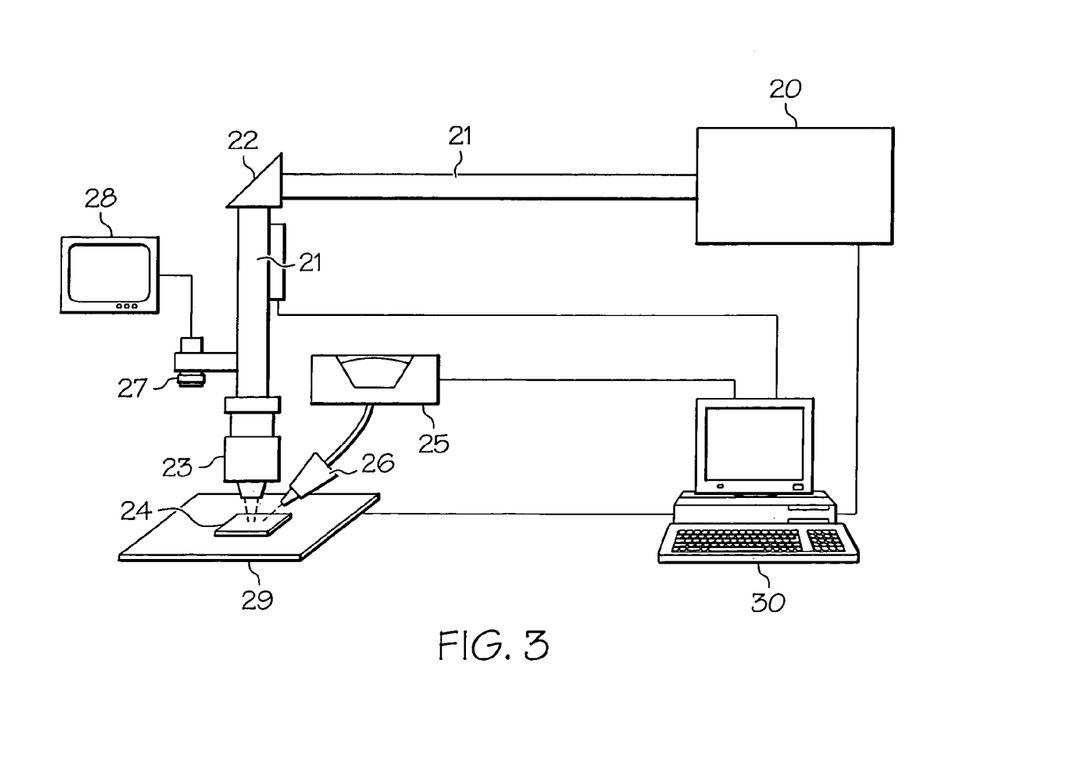
FIG. 3 is a schematic representation of the equipment and apparatus used to perform laser powder fusion welding repair according to an embodiment of the present invention.

Referring now to FIG. 3 there is shown a schematic diagram of a general apparatus for laser generation and control that may be used in the multiple laser welding system according to an embodiment of this invention. Laser generating means 20 generates a laser used in the welding system. A laser is directed through beam guide 21, through mirror 22, and through focus lens 23. The laser then impinges on a surface of the workpiece 24. Components such as beam guide 21, mirror 22, and focus lens 23 are items known in the art of laser powder fusion welding. Beam guide 21 may include fiber optic materials such as fiber optic laser transmission lines.

As described above, the laser system of FIG. 3 generates a single laser beam. However, the method of the present invention employs multiple lasers as described further herein. Thus in one embodiment of the present invention there is a laser generating means 20 for each laser. Additionally each laser of the multiple laser arrays may also require an individual conveyance means such as a combination of beam guide 21, mirror 22, and focus lens 23.

A means for providing a filler or cladding material is also included for use with the main laser, the laser effecting the cladding operation. Preferably this filler material may be provided in powder feeder 25. In such an embodiment the powder is fed onto the workpiece through powder feed nozzle 26. A coaxial or off-axis arrangement may be used with powder feed nozzle 26 with respect to the main laser. Alternatively, filler material may be provided through other means such as a wire feed.

Other components of the laser-welding system include a vision CCD camera 27 and video monitor 28. The image taken by the camera can also be fedback to the controller screen 30 for positioning and welding programming. The workpiece 24 is held on a work table 29. An inert gas shield (not shown) is fed through guides (not shown) onto the workpiece 24. The inert gas shield is directed onto a portion of the surface of the workpiece 24 during laser welding.

Controller 30 may be a computer numerically controlled (CNC) positioning system. CNC controller 30 coordinates components of the system. As is known in the art the controller may also include a digital imaging system. The controller guides movement of the laser and powder feed across the face of the workpiece 24. In a preferred embodiment, movement of the workpiece in the XY plane is achieved through movement of the worktable. Movement in the up and down, or Z-direction is achieved by control of the laser arm; i.e., pulling it up or lowering it. Alternative methods of control are possible, such as controlled movement of the workpiece in all three directions, X, Y, and Z as well as rotation and tilt.

Figure 4:
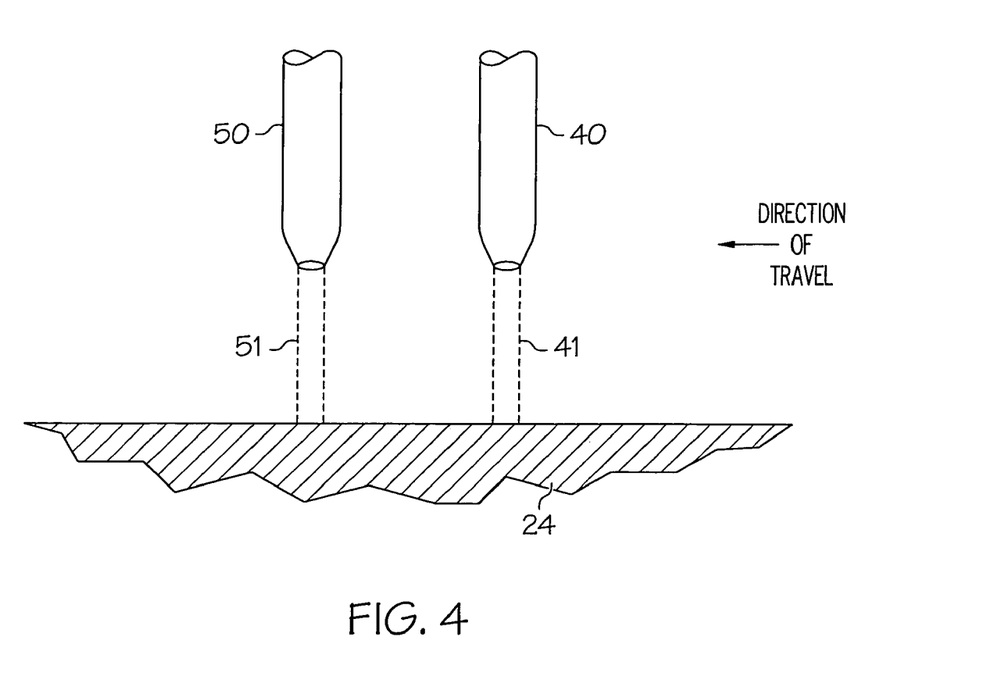
FIG. 4 is a side view of multiple lasers projecting onto a workpiece in accordance with an embodiment of the present invention.
Figure 5:
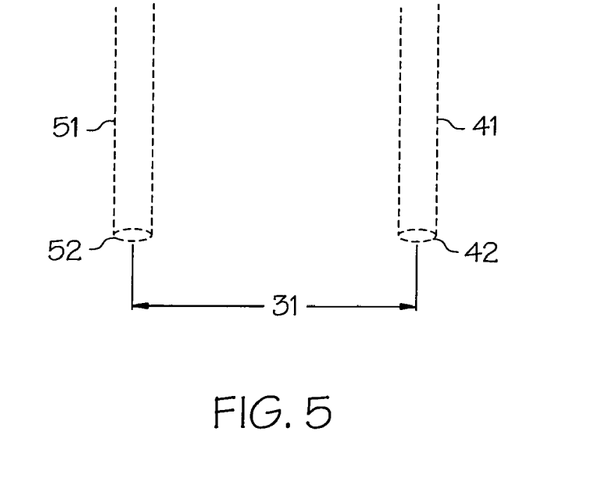
FIG. 5 is a perspective view of multiple lasers projecting at multiple spots on a workpiece in accordance with an embodiment of the present invention.
Figure 6:
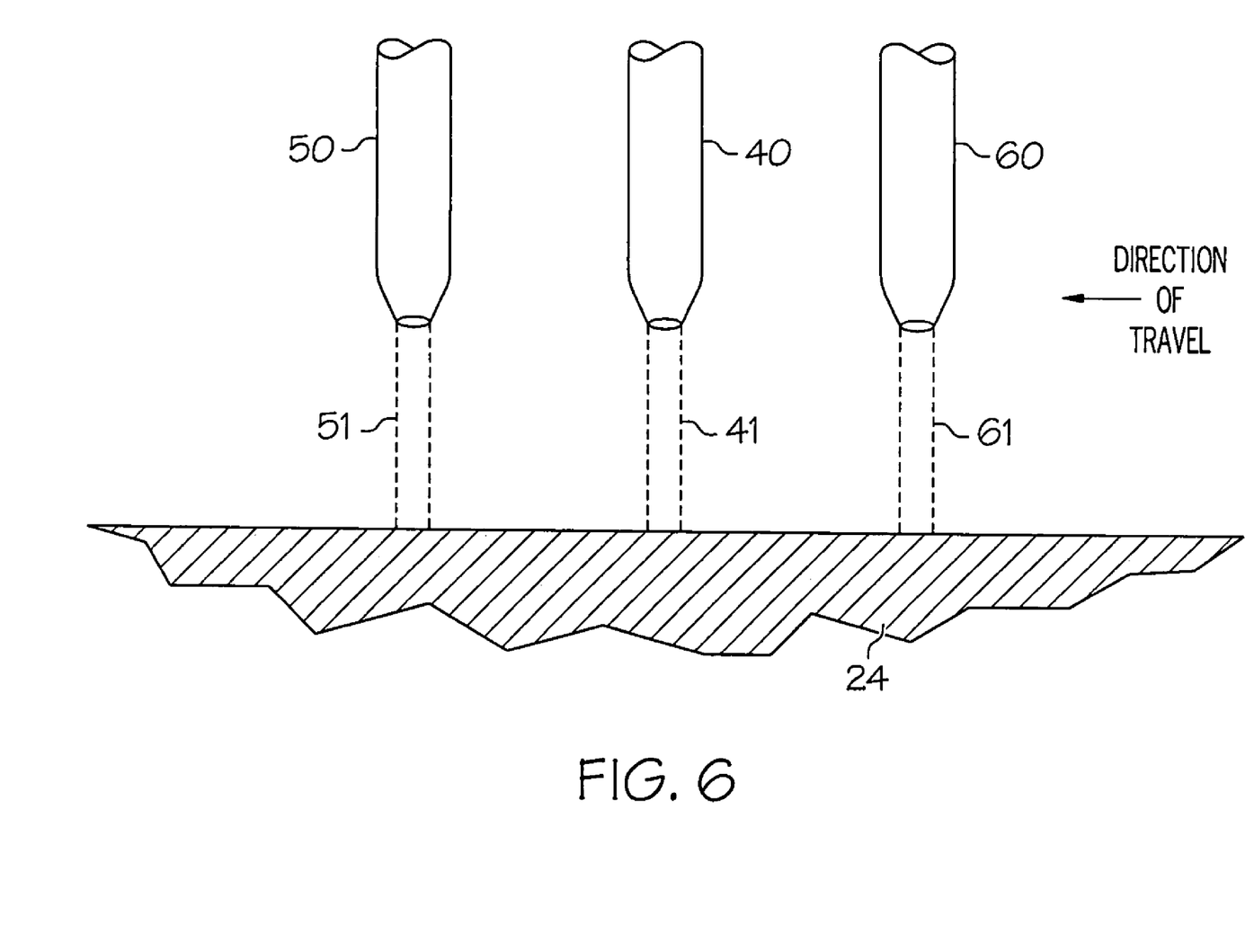
FIG. 6 is a side view of multiple lasers projecting onto a workpiece in accordance with an embodiment of the present invention.

FIGS. 4, 5, and 6 now illustrate embodiments of the multiple laser arrays. As further shown in FIG. 4 one embodiment of the laser beam array in accordance with the invention includes main beam 41 and secondary beam 51. Main beam 41 is projected onto workpiece 24 through main laser conveyance 40, and secondary beam 51 is projected onto workpiece 24 through secondary conveyance 50. In one embodiment, main conveyance 40 and secondary conveyance 50 may be optic fiber lines used for transmitting and projecting lasers. Other components of laser generation and control as shown in FIG. 3 may also be present in the multiple laser arrays of FIGS. 4, 5, and 6. Main laser beam 41 in FIGS. 4, 5, and 6 represents the laser used to perform laser welding, cladding, and deposition. Thus filler material and inert gas (though not shown in those figures) are disposed proximate main laser 41. In a preferred embodiment, secondary laser 51 is used for pre-heating and post-welding heat treatment.

FIG. 4 illustrates main beam 41 and secondary beam 51 in vertical alignment and normal to the surface of the workpiece. However, other arrangements, such as main beam 41 and secondary beam 51 at angles other than normal with respect to the surface of the workpiece 24 are also possible. Main beam 41 and secondary beam 51 may also be at different angles.

As shown in FIG. 4 laser array provides secondary beam 51 in advance of main beam 41 with respect to the shown direction of travel. In this arrangement, secondary beam 51 provides a preheating on work surface 24. If the direction of travel is reversed, with main beam 41 now moving in advance of secondary beam 51 with respect to work surface 24 secondary beam provides a post-welding heat treatment of work surface.

In a preferred embodiment laser array moves along direction of travel at a set rate of speed. In so doing both main laser 41 and secondary laser 51 move at substantially the same rate. The traverse speed or linear velocity of the laser array is preferably between approximately 5 to 22 inches/minute, and more preferably between approximately 5 to 14 inches/minute. It is noted that this traverse speed may actually be affected by movement of work table 29 relative to main laser 41 and secondary laser 51. A spacer or framework, not shown, is used to hold main laser conveyance 40 and secondary laser conveyance 50 at a preferred spacing so that in movement, main laser 41 and secondary laser 51 likewise maintain a preferred spacing. Further, movement of the laser array is simultaneous movement whereby all lasers, main, secondary, and others if present all move at the same time.

Referring now to FIG. 5 there is shown a detailed view of main laser 41 and secondary laser 51 as impinging on work surface 24. More particularly, main laser 41 is shown to impinge on workpiece 24 at main spot 42, and secondary laser 51 impinges on workpiece 24 at secondary spot 52. The area covered by main spot 42 and secondary spot 52 may be varied and needs not be the same. In one preferred embodiment, secondary spot 52 has a larger defocus distance and thus a larger spot size in comparison with main spot 42. This is preferred when, for example, secondary laser 51 is used to preheat the workpiece, when secondary laser 51 travels in advance of main laser 41 along the direction of travel. It is also preferred when secondary laser 51 trails main laser 41 and thus acts as a post welding heat treatment. In a preferred embodiment the inter-beam spacing 31 between the main laser beam 41 and the secondary laser beam 51 is between approximately 0.060 inch to approximately 0.500 inch, and more preferably between approximately 0.060 to approximately 0.280 inch. This is the distance as measured at the center point of main spot 42 in comparison with the center point of secondary spot 52. When main laser conveyance 40 and secondary laser conveyance 50 are vertically aligned normal to the work surface, this distance will also necessarily be the approximate distance between the axis of projection for main laser conveyance 40 and secondary laser conveyance 50.

While FIG. 5 illustrates main spot 42 and secondary spot 52 in circular form, it is to be appreciated that other geometries are possible. When for example main laser 41 and secondary laser 51 are set at angles other than normal to the work surface, the shape of the laser projection on the work surface will necessarily be ellipsoid. Thus the designation of a "spot" is not meant to be limited to strictly circular forms, but is also meant to include other shapes cast by angled laser projections onto the work surface.

A further embodiment in accordance with the invention is illustrated in FIG. 6. As shown, the laser array includes three lasers, main laser 41, secondary laser 51, and tertiary laser 61. Again three conveyance mechanisms, such as optic fiber laser beam transmission lines, main laser conveyance 40, secondary laser conveyance 50, and tertiary laser conveyance 60, are used to transmit and project each respective laser beam. As shown in FIG. 6 laser array provides secondary beam 51 in advance of main beam 41 with respect to the shown direction of travel. Tertiary beam 61 is shown lagging main beam 41 with respect to the direction of travel. In this arrangement, secondary beam 51 provides a preheating on work surface 24, and tertiary beam 61 provides a post-welding heating of workpiece 24. In the laser array using three lasers a spacer may be used to maintain the preferred spacing among the main, secondary, and tertiary lasers. The preferred spacing between the main laser 41 and tertiary laser 61 is the same as that stated for the spacing between main laser 41 and secondary laser 51. In a preferred embodiment the inter-beam spacing between the main laser beam 41 and the tertiary laser beam 61 is between approximately 0.060 inch to approximately 0.500 inch, and more preferably between approximately 0.060 to approximately 0.280 inch.

Again, the lasers of FIG. 6 may each be directed at an individual angle which is the same as or different from one another. The angle needs not be normal to the surface of the workpiece. In the embodiment with multiple lasers, it is sometimes convenient to angle each laser conveyance so as to provide space for the laser conveyance mechanisms as well as for filler material dispersal equipment and inert gas equipment.

As stated, the laser array disclosed herein is suitable for use with laser welding methods such as the YAG, $CO_2$, fiber, and direct diode lasers. Thus, for example, arrays are possible in which all lasers, main, secondary, and tertiary are the same type of lasers: YAG, $CO_2$, fiber and direct diode lasers. Further, combinations are possible in which a main laser is one kind of laser and the secondary laser is a different kind of laser. Further if there is a tertiary laser, it may be the same or different from the main and/or secondary laser. In one preferred embodiment, however, in connection with laser powder fusion welding, it is preferred to use one of $CO_2$, YAG, direct diode and fiber lasers as the main laser and use either a YAG, fiber, or direct diode laser as the secondary or tertiary laser. It is preferred to use a method of laser conveyance and projection with respect to secondary laser 51 and tertiary laser 61 that allows use of optic fiber laser beam lines due to the space savings involved with such a means.

In a preferred embodiment, the power of the main laser 41 is between about 50 to about 2500 watts and more preferably between about 50 to about 1500 watts. The powder feed rate of powder filler material is between about 1.5 to about 20 grams per minute and more preferably about 1.5 to about 10 grams per minute. Traveling speed for the motion of the substrate work table 29 relative to the main laser beam 41 is about 5 to about 22 inches per minute and more preferably about 5 to about 14 inches per minute. The size of the main spot 42 is about 0.02 to about 0.1 inches in diameter and more preferably about 0.04 to about 0.06 inches. The laser-welded bead width that results through the main laser 41 is thus about 0.02 to about 0.100 inches and more preferably about 0.04 to about 0.06 inches in width.

Preferred parameters for use of the secondary laser 51 include the following. A defocused laser beam is used. The laser beam size on the target is preferably of a diameter between approximately 0.020 and approximately 0.300 inch. More preferably the last beam has a size on target of about 0.040 to about 0.200 inch. The laser power used in the secondary laser 51 is about 50 to about 1,800 watts, and more particularly between about 50 to about 1,200 watts. The parameters just mentioned for secondary laser 51 are the same for tertiary laser 61 when a third laser is used in the array.

Having described the multi-laser fusion assembly from a structural standpoint, a method of using such an assembly in a welding operation will now be described.

A suitable workpiece is first selected. Inspection of the workpiece confirms that the workpiece is a suitable candidate for repair by a laser welding process. The workpiece should not suffer from mechanical defects or other damage that would disqualify it from return to service, other than wear, which can be repaired by the welding method. The workpiece may receive pre-welding treatment such as stripping coatings, pre-welding machining, degreasing and grit blasting in order to remove materials that interfere with laser welding such as oxides, inclusions, impurity buildups, and contamination on the face of the workpiece. Next, a digital monitoring system such as used by a CNC controller may be used to identify a weld path on the workpiece. Other welding parameters such as weld path geometry or stitch patterns, distances, velocities, powder feed rates, and laser power conditions are entered.

Laser welding deposition steps are then begun. If a pre-welding heat treatment is used, secondary laser 51 projects at secondary spot 52 of the workpiece. The energy directed onto secondary spot 52 acts to heat this area to a desired level. The movement of the workpiece relative to the laser array is such that main laser 41 then sweeps across some of the same area as that covered by secondary spot 52 in the area covered by main spot 42. Main laser beam 41 interacts with a filler such as a superalloy powder stream, and melts the superalloy powder stream. The surface of the workpiece is further heated by main laser 41. When the superalloy powder stream is completely melted and metallurgically bonded on the surface, a superalloy clad is formed on the surface of the superalloy substrate 24 resulting in a weld. The travel of the lasers across the workpiece is timed such that the laser cladding occurs within a given time after the heating operation. Thus the preheating assists the laser welding operation. The preheating lessens the rapidity to which a welded area will be heated if only a single laser were used, thus lessening or eliminating potential cracking.

The degree to which main spot 42 overlaps secondary spot 52 may vary. In a preferred embodiment secondary spot 52 is somewhat larger than main spot 42. If desired, however, the sizes may be made to be substantially similar.

In a post-welding heat treatment operation, secondary laser 51 trails main laser 41. Thus, main laser 41 first affects a laser cladding on the surface of workpiece 24 at an area corresponding to main spot 42. A following laser designated secondary laser 51 (but which may be either a secondary laser or tertiary laser as shown in FIGS. 4 and 6 depending on the number of lasers in the array), then casts secondary spot 52 across an area substantially overlapping main spot 42. The action of secondary spot 42 is to heat the area that has just been welded. The post welding heat treatment thus slows the rate of cooling encountered at the weld spot which helps to minimize or eliminate any potential cracking. Again the degree of overlap of main spot 42 and secondary spot 52 may vary though it is preferred that the post-welding heat treatment exceed in area that of the welded area.

In an array such as illustrated in FIG. 6 laser powder fusion welding is combined with preheating and post-welding heat treatment. The method is as described above with preheating occurring in advance of welding and heat treatment following the welding. Movement of the lasers is coordinated such that the welded area is first heated and, after welding, is heated again.

As stated, each laser, main, secondary, and tertiary, moves simultaneously. Thus, each laser beam spot is similarly moving across the surface of the workpiece. In this way each beam spot maintains its position on the surface relative to other beam spots. Moreover, individual areas of the work surface receive separate heating as main, secondary, and tertiary beam spots sweep across each area.

Multiple passes may be used to build up required dimension of material where one pass overlaps a previous pass and successive passes are laid atop a previous pass. Similarly, the method allows for cladding of an area greater than that covered in a single pass by laying successive passes alongside previous passes thus covering a desired area. If needed, repetitions of the laser welding passes can be done in order to achieve a required level of buildup and/or coverage over a required area. Upon conclusion of a first pass the CNC controller can check the thickness of the weld deposit.

While the laser welding repair operation may be adapted to other kinds of workpieces, it is designed and intended for particular application to restoring of gas turbine components such as turbine blades and vanes. This includes repairs to the blade tip, platform, z-notch, and leading/trailing edge repair. The repairs include resurfacing and restoration of dimensional requirements to worn surfaces. Oil pressure tube dimensional restorations may also be achieved with the disclosed method and apparatus. The welding system of the present invention can also restore the wear surface of a Z-notch shroud.

Further, a preferred embodiment of operation relates to the deposition or cladding of a superalloy material on the work surface where the deposited superalloy material matches the composition of the workpiece superalloy. The objective in such an operation is to build up the worn area on the workpiece. Such an operation is thus distinct from a welding operation, a separate embodiment, in which two separate workpieces are joined together as at a groove.

The powder or filler used in the laser welding process is compatible with the alloy comprising the workpiece; preferably the powder or filler is the same alloy that was used to cast the workpiece. The dimension of filler powder is measured by its mesh size, ranging from +45 mesh to −100 mesh. (45 to 150 microns). Some superalloy filler materials that are suitable for the practice of this invention and that are commercially available in powder and wire form include: HS188, Stellite 694, Hastelloy X, INCO 713, INCO 738, INCO 939, MarM247, Rene 80, C 101 and modified MCrAlY (modified with one or a combination of Pt, Pd, Re, Ta, Hf, Zr, Ru, Si, C and B; where M is selected from the group consisting of Ni, Co and Fe). Some matrix or base superalloys, which are suitable for the practice of this invention and may be laser welded include: INCO738, C101, MarM-247, Rene80, GTD111, Rene125, Rene142, SC 180, ReneN5 and N6, CMSX-2, CMSX-4 and CMSX-10, and PWA 1480 and 1484.

One laser embodiment that has been found to operate in the present welding method is known as a direct diode laser. A direct diode laser provides a compact size, good energy absorptivity, and a reasonably large beam spot size. Laser Diodes, sometimes called injection lasers, are similar to light-emitting diodes [LEDs]. In forward bias [+on p-side], electrons are injected across the P—N junction into the semiconductor to create light. These photons are emitted in all directions from the plane on the P—N junction. To achieve lasing, mirrors for feedback and a waveguide to confine the light distribution are provided. The light emitted from them is asymmetric. The beam shape of the HPDDL system are rectangular or a line source. This beam profile does not create a "key-hole", thus yielding a high quality welding process. Due to their high efficiency, these HPDDL are very compact and can be mounted directly on a tube mill or robot enabling high speed and high quality welding of both ferrous and nonferrous metals.

Additionally a YAG laser may also be used in an embodiment of the present invention. The YAG laser refers to an Yttrium Aluminum Garnet laser. Such lasers also may include a doping material, such as Neodymium (Nd), and such a laser is sometimes referred to as an Nd:YAG laser. The present invention may also be practiced with YAG lasers that use other dopant materials. When operated in continuous wave (CW) mode the laser provides sufficient heat at a specific spot to effect laser welding.

A primary advantage of the disclosed repair method is the highly controlled application of heat through the multiple laser arrays. The use of a preheating laser allows a first heating of the substrate followed by a second welding of both the substrate and filler material. Additionally the method allows a post welding heat treatment that further controls the rate of cooling experienced by the repaired surface. The heat involved in the welding operation is thus controlled so that the cracking and damage encountered in other welding techniques is avoided or minimized. The degree of hardness of the weld is comparable with that of the underlying matrix material found in the original turbine blade.

A further advantage of the present invention relates to the use of a welding alloy material that is the same material as that used to cast the workpiece. This method can fully restore both geometry and dimension as well as desired properties of a degraded turbine blade. A turbine blade that has been restored with the same material as that from which it was cast may go into service with almost newly cast turbine blades. Thus, blades that are restored with this technique provide the added flexibility of being placed into engines with new blades.

Still a further advantage of this method is the small amount of powdered material consumed by the laser fusion operation. The laser array efficiently fuses the powdered alloy to the substrate material with only a little waste of powder. This realizes a cost savings in material.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for resurfacing a worn surface of a gas turbine engine superalloy component comprising:
   moving a first laser beam over a workpiece surface at a given speed where the first laser beam is projected onto the workpiece at a first laser beam spot;
   moving a second laser beam over a workpiece surface at approximately the same given speed as the first laser beam where the second laser beam is projected onto the workpiece at a second laser beam spot;
   setting the first laser beam spot at a set distance from the second laser beam spot wherein the distance between the first laser beam spot and the second laser beam spot is between approximately 0.060 and approximately 0.500 inch; and
   feeding a superalloy powder to the worn surface of the component.

2. The method of claim 1 wherein said first laser has a power of between about 50 to about 2500 watts.

3. The method according to claim 1 wherein the superalloy powder is fed to the worn surface of the component at a powder feed rate of between about 1.5 to 20 grams per minute.

4. The method according to claim 1 wherein the rate of speed of the first laser beam and the second laser beam is about 5 to about 22 inches per minute.

5. The method according to claim 1 wherein the diameter of the first laser beam spot is between approximately 0.02 to about 0.10 inches.

6. The method according to claim 1 wherein the second laser beam spot has a diameter of between approximately 0.020 and approximately 0.300 inches.

7. The method according to claim 1 wherein the second laser beam has a power of between approximately 50 and approximately 1,800 watts.

8. A method for resurfacing a worn surface of a gas turbine engine superalloy component comprising:
   moving a first laser beam over a workpiece surface at a given speed where the first laser beam is projected onto the workpiece at a first laser beam spot wherein the diameter of the first laser beam spot is between approximately 0.04 to about 0.06 inches;
   providing a first energy carried by the first laser beam thereby heating the workpiece at the first laser beam spot;
   moving a second laser beam over a workpiece surface at approximately the same given speed as the first laser beam where the second laser beam is projected onto the workpiece at a second laser beam spot;
   providing a second energy carried by the second laser beam thereby heating the workpiece at the second laser beam spot;
   setting the first laser beam spot at a set distance from the second laser beam spot;
   feeding a superalloy powder to the worn surface of the component; and
   heating said superalloy powder thereby affecting a laser cladding on the workpiece surface.

9. A method for resurfacing a worn surface of a gas turbine engine superalloy component comprising:
   moving a first laser beam over a workpiece surface at a given speed where the first laser beam is projected onto the workpiece at a first laser beam spot;
   providing a first energy carried by the first laser beam thereby heating the workpiece at the first laser beam spot;
   moving a second laser beam over a workpiece surface at approximately the same given speed as the first laser beam where the second laser beam is projected onto the workpiece at a second laser beam spot;
   providing a second energy carried by the second laser beam thereby heating the workpiece at the second laser beam spot;
   setting the first laser beam spot at a set distance from the second laser beam spot wherein the distance between the first laser beam spot and the second laser beam spot is between approximately 0.060 and approximately 0.500 inch;

feeding a superalloy powder to the worn surface of the component; and heating said superalloy powder thereby affecting a laser cladding on the workpiece surface.

10. The method of claim 9 wherein said first laser carries a power of between about 50 to about 1500 watts.

11. The method according to claim 9 wherein the superalloy powder is fed to the worn surface of the component at a powder feed rate of between about 1.5 to 10 grams per minute.

12. The method according to claim 9 wherein the rate of speed of the first laser beam and the second laser beam is about 5 to about 14 inches per minute.

13. The method according to claim 9 wherein the distance between the first laser beam spot and the second laser beam spot is between approximately 0.060 and approximately 0.280 inch.

14. The method according to claim 9 wherein the second laser beam spot has a diameter of between approximately 0.040 and approximately 0.200 inches.

15. The method according to claim 9 wherein the second laser beam carries a power of between approximately 50 and approximately 1,200 watts.

16. An apparatus for laser cladding a worn surface of a gas turbine engine superalloy blade or vane comprising:

a first laser generating a first laser beam that is projected onto a surface at a first laser beam spot;

a second laser, wherein the second laser is a fiber laser, generating a second laser beam that is projected onto a surface at a second laser beam spot;

means for moving the first laser and second laser relative to the surface whereby the first laser beam spot and second laser beam spot move over the surface but are held at a given distance apart; and means for discharging a superalloy powder onto the surface.

17. A method for laser cladding a worn workpiece surface of a gas turbine engine superalloy component comprising:

moving a first laser beam over a workpiece surface at a given seed where the first laser beam is projected onto the workpiece at a first laser beam spot;

providing a first energy through the first laser beam thereby heating the workpiece surface at the first laser beam spot;

moving a second laser beam over a workpiece surface, simultaneous to the movement of the first laser beam, at approximately the same given speed as the first laser beam where the second laser beam is projected onto the workpiece surface at a second laser beam spot;

providing a second energy through the second laser beam thereby heating the workpiece surface at the second laser beam spot;

setting the first laser beam spot at a set distance from the second laser beam spot wherein the distance between the first laser beam spot and the second laser beam spot is between approximately 0.060 and approximately 0.500 inch;

feeding a superalloy powder to the worn surface of the component; and heating said superalloy powder thereby affecting a laser cladding on the workpiece surface.

18. The method according to claim 17 further comprising controlling the movement of the first laser beam and the second laser beam whereby the second laser beam spot sweeps across at least a part of the area on the workpiece surface covered by the first laser beam spot.

19. The method according to claim 17 further comprising controlling the movement of the first laser beam and the second laser beam whereby the first laser beam spot sweeps across at least a part of the area on the workpiece surface covered by the second laser beam spot.

20. The method according to claim 17 wherein the first laser beam spot is smaller in area than the second laser beam spot.

21. The method according to claim 17 wherein the first laser beam spot is larger in area than the second laser beam spot.

22. The method according to claim 17 wherein said cladding step further comprising cladding with a nickel based superalloy.

23. The method according to claim 17 wherein the first laser beam provides a preheating and the second laser beam provides laser cladding.

24. The method according to claim 17 further comprising moving a third laser beam over a workpiece surface at a given speed where the third laser beam is projected onto the workpiece surface at a third laser beam spot; and providing a third energy through the third laser beam thereby heating the workpiece surface at the third laser beam spot.

25. The method according to claim 24 wherein the first laser beam provides a preheating, the second laser beam provides laser cladding, and the third laser beam affects a post-welding heat treatment.

26. The method according to claim 24 wherein the first power, second power, and third power are controlled so that the cladding occurs with minimal heat cracking in the workpiece.

27. An apparatus for laser cladding a worn surface of a gas turbine engine superalloy blade or vane comprising:

a first laser generating a first laser beam that is projected onto a surface at a first laser beam spot;

a second laser generating a second laser beam that is projected onto a surface at a second laser beam spot;

means for moving the first laser and second laser relative to the surface whereby the first laser beam spot and second laser beam spot move over the surface but are held at a given distance apart wherein the distance between the first laser beam spot and the second laser beam spot is between approximately 0.060 and approximately 0.500 inch; and means for discharging a superalloy powder onto the surface.

28. The apparatus according to claim 27 wherein the first laser preheats the surface and the second laser clads the surface.

29. The apparatus according to claim 27 wherein the second laser preheats the surface and the second laser clads the surface.

30. The apparatus according to claim 27 wherein the primary laser is selected from the group consisting of $CO_2$, Nd:YAG, direct diode, and fiber lasers.

31. The apparatus according to claim 27 further comprising means for heating the superalloy powder whereby said superalloy powder provides a laser cladding on the work surface.

32. The apparatus according to claim 27 wherein the secondary laser is an Nd:YAG laser.

33. The apparatus according to claim 27 wherein the superalloy powder is the same material as the turbine blade or vane.

34. An apparatus for laser cladding a worn surface of a gas turbine engine superalloy blade or vane comprising:

a first laser generating a first laser beam that is projected onto a worn surface at a first laser beam spot;

a second laser generating a second laser beam that is projected onto a worn surface at a second laser beam spot such that the distance between the first laser beam spot and the second laser beam spot is between approximately 0.060 and approximately 0.500 inch;

a third laser generating a third laser beam that is projected onto a worn surface at a third laser beam spot such that the distance between the second laser beam spot and the third laser beam spot is between approximately 0.060 and approximately 0.500 inch:

means for moving the first laser beam, the second laser beam, and the third laser beam thereby moving the first laser beam spot, second laser beam spot, and third laser beam spot on the worn surface;

means for controlling the energy provided to the first laser, the second laser, and the third laser thereby controlling the amount of heating on the worn surface provided by the first laser beam spot, the second laser beam spot, and the third laser beam spot; and means for providing a filler material to the worn surface for providing a laser cladding layer to the worn surface.

35. The apparatus according to claim 34 wherein said means for moving comprises a CNC controlled work table.

36. The apparatus according to claim 34 wherein said means for controlling comprises a CNC controller.

37. An apparatus for laser cladding a worn surface of a gas turbine engine superalloy blade or vane comprising:

a first laser generating a first laser beam that is projected onto a surface at a first laser beam spot;

a second laser, wherein the second laser is a direct diode laser, generating a second laser beam that is projected onto a surface at a second laser beam spot;

means for moving the first laser and second laser relative to the surface whereby the first laser beam spot and second laser beam spot move over the surface but arm held at a given distance apart; and means for discharging a superalloy powder onto the surface.

\* \* \* \* \*

UNITED STATES PATENT AND TRADEMARK OFFICE
CERTIFICATE OF CORRECTION

| | | |
|---|---|---|
| PATENT NO. | : 6,972,390 B2 | Page 1 of 1 |
| APPLICATION NO. | : 10/794207 | |
| DATED | : December 6, 2005 | |
| INVENTOR(S) | : Yiping Hu and William F. Hehmann | |

It is certified that error appears in the above-identified patent and that said Letters Patent is hereby corrected as shown below:

Column 13, line 40, replace "seed" with --speed--.

Signed and Sealed this

Twentieth Day of March, 2007

JON W. DUDAS
*Director of the United States Patent and Trademark Office*